July 26, 1938.   A. M. ANDERSON   2,125,213
INTERNAL COMBUSTION ENGINE
Filed April 14, 1937   2 Sheets-Sheet 1
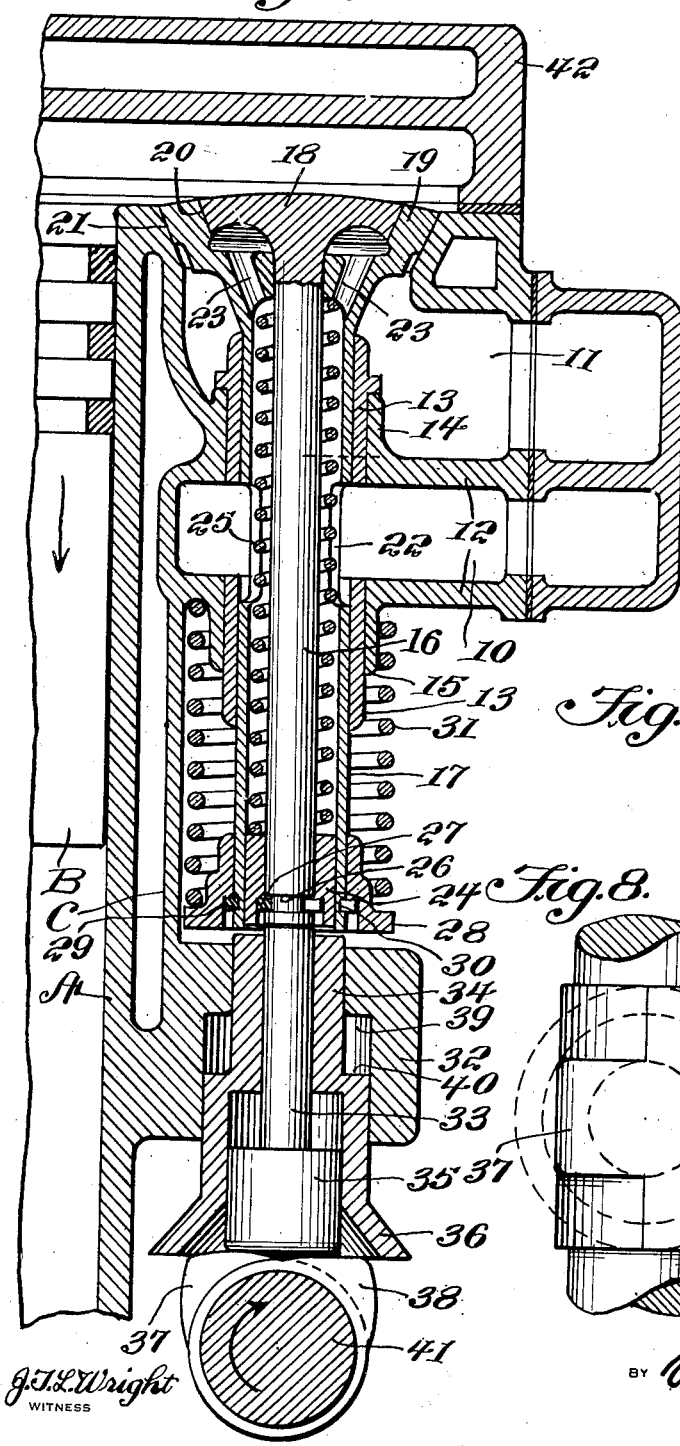
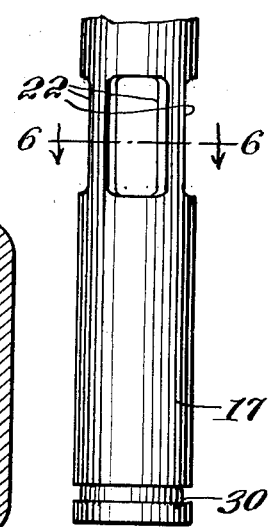
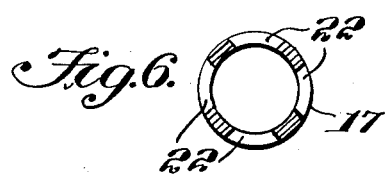
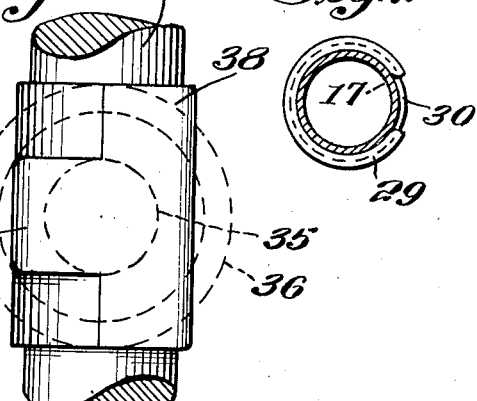
Ammon M. Anderson
INVENTOR
BY Victor J. Evans & Co.
ATTORNEYS
J. T. L. Wright
WITNESS July 26, 1938.  A. M. ANDERSON  2,125,213
INTERNAL COMBUSTION ENGINE
Filed April 14, 1937   2 Sheets-Sheet 2
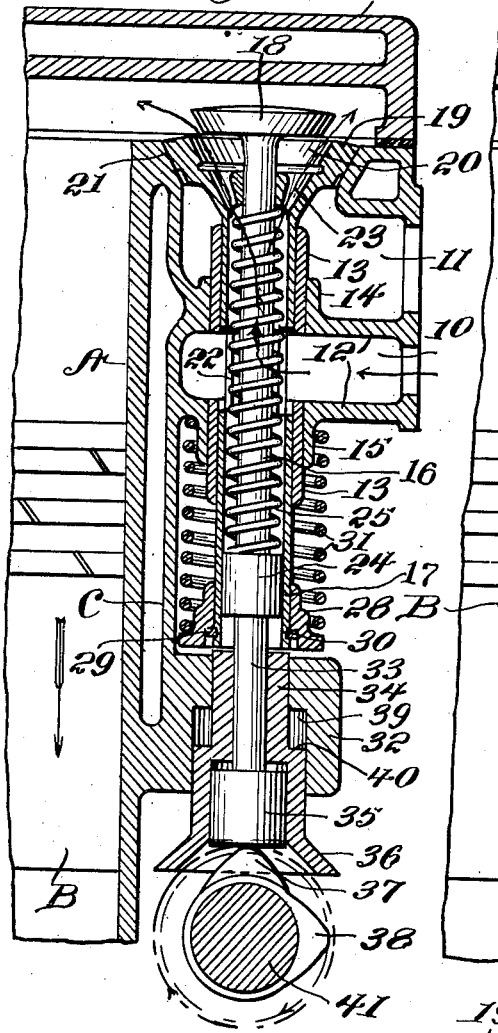
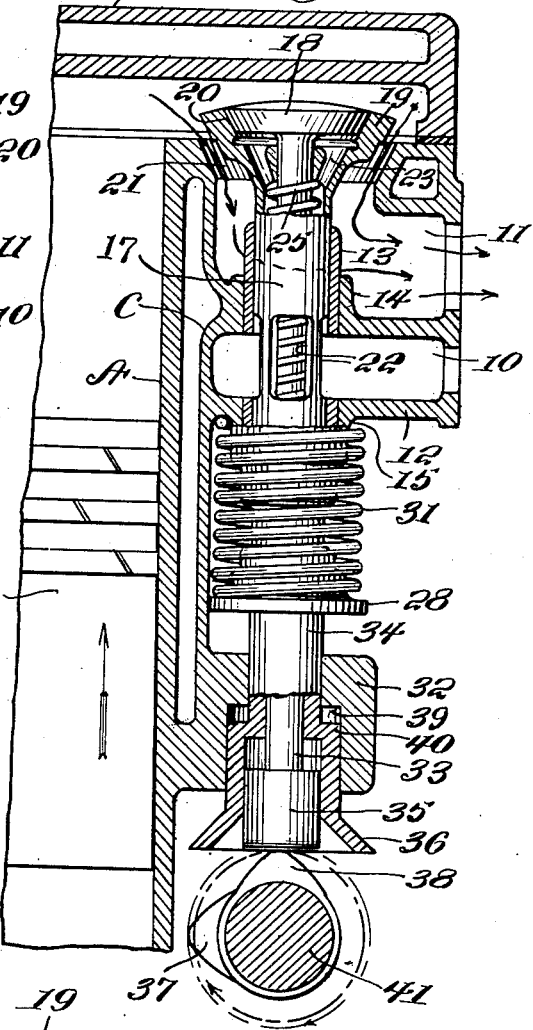
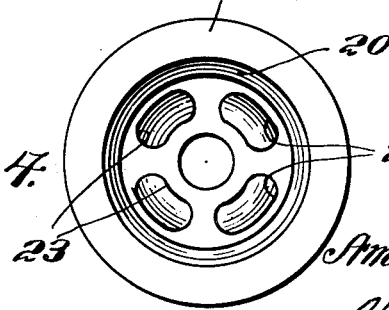
Ammon M. Anderson
INVENTOR
BY Victor J. Evans & Co.
ATTORNEYS Patented July 26, 1938

2,125,213

UNITED STATES PATENT OFFICE 2,125,213

INTERNAL COMBUSTION ENGINE

Ammon M. Anderson, Pecos, Tex.

Application April 14, 1937, Serial No. 136,914

1 Claim. (Cl. 123—188)

The invention relates to an engine and more especially to an internal combustion engine.

The primary object of the invention is the provision of an engine of this character, wherein the arrangement of the intake and exhaust valves is such as to increase efficiency and to improve economy in the working of the engine as well to to prolong the life of such engine, the valve arrangement being novel in its make-up.

Another object of the invention is the provision of an engine of this character, wherein the intake and exhaust valves are arranged one within the other and the same are controlled by cams for the opening and closing thereof and are guided under opening and closing movements in a firm manner so as to assure positive seating of such valves, the intake being effective for the cooling of the exhaust valve and in this manner lower grade fuel can be utilized in the working of the engine.

A further object of the invention is the provision of an engine of this character, wherein the valve arrangement renders the engine more compact and lighter in weight without sacrificing horse power and efficiency in operation.

A still further object of the invention is the provision of an engine of this character, which is extremely simple in its construction, thoroughly reliable and effective in operation, unique in the assemblage of the valves for intake and exhaust, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a fragmentary vertical longitudinal sectional view through an engine constructed in accordance with the invention.

Figure 2 is a view similar to Figure 1 showing the intake valve open at the intake stroke of the engine.

Figure 3 is a view similar to Figure 2 showing the exhaust valve open at the exhaust stroke of the engine.

Figure 4 is a top plan view of the intake valve.

Figure 5 is a fragmentary elevation of the stem of the intake valve.

Figure 6 is a sectional view on the line 6—6 of Figure 5 looking in the direction of the arrows.

Figure 7 is a horizontal sectional view taken through the intake valve stem showing the split retaining ring fitted therewith.

Figure 8 is an underside view of a fragment of the cam shaft, showing the cams for operating the two concentric valve lifters.

Similar reference characters indicate corresponding parts throughout the several views in the drawings.

Referring to the drawings in detail, A designates generally a portion of the cylinder of an internal combustion engine and B a portion of the reciprocating piston working within said cylinder, the latter being provided with a water jacket C as usual.

In the block of the body of the engine is formed intake and exhaust ways 10 and 11, respectively, the exhaust way 11 being uppermost with relation to the intake way 10. These ways 10 and 11 are provided with walls 12 while built in the latter is a tubular guide column in the form of a sleeve 13 fitting upper and lower bosses 14 and 15, respectively, which are integral with the wall.

Arranged within the column constituted by the sleeve 13 are the inner and outer valve stems 16 and 17, respectively, of intake and exhaust valves 18 and 19, respectively. The exhaust valve 19 is formed with a valve seat 20 for the intake valve 18 while the wall for the exhaust way 11 is formed at the point of communication of said way with the cylinder A with a valve seat 21 for the exhaust valve 19. The stem 16 is of the solid type while the stem 17 is tubular and is of considerably greater cross sectional diameter than the stem 16. This stem 17 has formed therein opposed windows or openings 22 which are in communication with the way 10 so that when the valve 18 is open intake flow from the way 10 leads upwardly through the stem 17 into the cylinder A. The exhaust valve 19 is formed with ports 23 for the passage of intake flow from the stem 17 therethrough on the opening of the intake valve 18 for delivery into the cylinder A.

Surrounding the stem 16 and slidably fitting the stem 17 is a guide collar 24 against which is seated a coiled expansion spring 25 about the stem 16 and also seated against the valve 19. This spring 25 functions to seat the valve 18 against its seat 20 in the valve 19. The stem 16 is formed with a channel or groove 26 accommodating a split retaining ring 27 for the collar 24 which rests against the said ring.

Surrounding the stem 17 is a collar 28 which is seated against a retaining ring 29 fitting a channel or groove 30 in the stem 17 and seated against this collar 28 is a coiled expansion spring 31, the same being also seated against the walling 12 for the intake way 10. The purpose of this spring is to seat the exhaust valve 19 against its seat 21.

Formed on the cylinder A beneath the stems 16 and 17 is a guide 32 in which are slidably fitted inner and outer valve lifters 33 and 34, respectively, the lifter 33 having the cam striker head 35 while the lifter 34 has the flared cam striking rim 36 and this lifter 33 is engageable with the stem 16 while the lifter 34 is engaged with the stem 17.

Operative against the head 35 is the lifter cam 37 while operative against the rim 36 is the lifter cam 38 and in this manner the valves 18 and 19 are controlled and operated.

When the valve 19 is lifted or unseated, communication between the cylinder A and the way 11 is had for the exhaust from the engine, the cams 37 and 38 being properly timed for intake and exhaust to and from the engine under the strokes of the piston B within the cylinder A.

The guide 32 is formed with a socket 39 for the stepped area 40 of the lifter 34 which is slidable in this guide 32 while the lifter 33 is slidable in the said lifter 34.

The cams 37 and 38 are built on the cam shaft 41. The flared rim 36 of the lifter 34 affords a clearance for the cam 37 for the engagement of the latter with the head 35 in the operation of the engine.

The block of the cylinder A has fitted therewith the removable head 42 which enables access to be had to the valves 18 and 19 and the companion seats therefor. By the presence of the outwardly flared annular striking rim on the exhaust valve stem, free rotation of the valve is permitted. The inlet valve is also freely rotatable. The free rotation of these valves allows a certain amount of self-grinding in the use thereof.

What is claimed is:

In an engine of the kind described, a piston cylinder, intake and exhaust valves concentrically operative one within the other for controlling intake and exhaust to and from the cylinder, the exhaust valve having an intake way within it controlled by the intake valve, interfitted lifters for said valves, said valves being freely rotatable about their axes, interfitted enlarged inner and outer heads on said lifters, an outwardly flared annular striking rim on the outer head and concentric to the inner head, lifter cams rotatably mounted on a cam shaft for engaging the said heads, the said striking flange being engaged by one cam and forming a clearance for the other cam, the cam engaging the flared striking rim being of greater width than the other cam for double contact with the said striking rim, and means urging the valves to closing positions.

AMMON M. ANDERSON.